US006804722B1

(12) United States Patent
Nishi

(10) Patent No.: US 6,804,722 B1
(45) Date of Patent: Oct. 12, 2004

(54) SYSTEM, METHOD AND DEVICE FOR COMMUNICATION SERVICE PROVISIONING

(75) Inventor: Koji Nishi, Tokyo (JP)

(73) Assignee: NEC Corporation (JP)

( * ) Notice: Subject to any disclaimer, the term of this patent is extended or adjusted under 35 U.S.C. 154(b) by 640 days.

(21) Appl. No.: 09/611,912

(22) Filed: Jul. 7, 2000

(30) Foreign Application Priority Data

Jul. 9, 1999 (JP) .......................................... 11-195282

(51) Int. Cl.[7] .............................................. G06F 15/16
(52) U.S. Cl. ....................... 709/234; 709/223; 709/224; 709/227; 709/228; 709/234; 709/203; 370/234
(58) Field of Search ................................ 709/201–203, 709/223–224, 227–228, 234; 370/254

(56) References Cited

FOREIGN PATENT DOCUMENTS

| JP | 974417 | 3/1997 |
|----|--------|--------|
| JP | 9-74422 | 3/1997 |
| JP | 9-135243 | 5/1997 |
| JP | 9-162991 | 6/1997 |

OTHER PUBLICATIONS

Yoshiaki Kiriha, et al. "A Dispersion Type Functional Integration Network Management System," Technical Research Report, Electronic Information and Communications Society, Nov. 20, 1992, pp. 25–30, vol. 92, No. 317.

Japanese Office Action issued Oct. 17, 2003 (w/ English translation of relevant portion).

*Primary Examiner*—Jack B. Harvey
*Assistant Examiner*—Hien C. Le
(74) *Attorney, Agent, or Firm*—Dickstein, Shapiro, Morin & Oshinsky, LLP.

(57) ABSTRACT

A communication service provision system, method and device to provide a communication service which provision various communication devices to realize communication service ordered by a customer and reduce the load of an operator by utilizing a policy server. In the invention, the following are performed. A customer care server executes order processing suitable for communication service ordered by a customer. An operational flow manager activates a design server based upon contents stored in an operational flow storage when the order processing is finished and instructs the design server to execute route computing. When the operation is finished, a policy server sets configuration data to respective communication devices composing a route suitable for the order of the customer. Network design can be also performed by inputting route data and policy data from the policy server without using the design server.

3 Claims, 15 Drawing Sheets

(PROCESSING OPERATIONAL FLOW STATE MANAGEMENT DATA)

(FLOW OF PROCESSING BY DESIGN SERVER)

(FLOW OF PROCESSING BY POLICY SERVER)

(PROCESSING SETTING STOPPAGE MESSAGE)

(INPUT PROCESSING BY POLICY SERVER)

(CONTROL OF POLICY SERVER)

SYSTEM, METHOD AND DEVICE FOR COMMUNICATION SERVICE PROVISIONING

BACKGROUND OF THE INVENTION

1. Field of the Invention

The present invention relates to a network management system and method and device for managing a communication network, particularly relates to the invention for a communication provisioning system which perform setting to a communication device required when communication service is provided.

2. Description of the Related Art

As communication is advanced, a demand for communication service of organizing a network of configuration and quality according to an order of a customer increases. Setting to various communication devices required when such communication service is provided to a customer is generally performed using a network management system. An operator of the network management system enters configuration data via an input device when the service is provided and manually performs setting.

As for the service, technique disclosed in Japanese published unexamined patent application No. Hei 9-74417 is proposed. According to the technique, the same setting data for a unit added for redundancy is stored in a setting data storage area beforehand independent of whether the unit is actually installed in a slot or not when the configuration of the installation of the unit used for redundancy is determined at the time of activating a communication device.

The technique has the following problems. First, a first problem is that data cannot be freely set according to the contents of service and quality required for the service. The reason is that setting data used for a communication device in the technique is fixed and fixed setting data is set to a unit the configuration of the installation of which is determined.

A second problem is that the direct operation of an operator is required in the technique. The reason is that a network management system that manages communication devices is based upon the existence of an operator or the concrete operation of an operator.

Further, a third problem is that when various communication devices configuring a network are set, effective technique related to setting is not disclosed or developed yet.

In the meantime, as to components configuring a network, various special servers provided with higher functions are published. For example, a design server is provided with a function of computing so as to determine a possible path in a network. Also, a policy server is provided with a function of making a policy as the policy of the management of a network dynamically activate. At the present time when a network is provided with high functions and becomes intelligent owing to distributed intelligent processing of these various servers, these servers are to be effectively utilized.

SUMMARY OF THE INVENTION

The object of the invention is to provide a communication service provision system, method and device which can set various communication devices required to realize communication service ordered by a customer without requiring an operator.

Another object of the invention is to provide a communication service provision system and it's method which can reduce the load of an operator to realize communication service ordered by a customer by utilizing a policy server.

According to a first aspect of the invention, the communication service provision system is provided with operational flow storage part that stores operational flow composed of a series of operations that former operation in time is order processing for processing an order of a customer and the last operation is setting for setting configuration data to respective communication devices composing a network for realizing the order of the customer out of the respective operations as procedure every unit for providing communication service to the customer as an end user, corresponding server storage part that stores servers to execute respective operations stored in the operational flow storage part, operation termination detecting part for detecting the termination of respective operations stored in the operational flow storage part and operations switching part for reading operation to be executed next stored in the operational flow storage part every time the operation termination detecting part detects the termination of one operation and having the next operation executed by activating a server in charge of the operation.

That is, according to the first aspect of the invention, operational flow composed of a series of operations for providing communication service to a customer is stored in the operational flow storage part and the name of a server that executes individual operation is stored in the corresponding server storage part. These storage part may be also substantially one by combining these contents. Operation termination detecting part detects the termination of individual operation in operational flow and operations switching part enables the next operation to be executed in case the next operation is left. Therefore, after an order of a customer is processed by operation for former order processing in time, operations up to setting for setting configuration data to respective communication devices composing a network for realizing the order of the customer are automatically executed.

A second aspect of the invention is characterized in that the name of the policy server is stored in the corresponding server storage part according to the first aspect of the invention as a server for executing setting. The policy server is provided with a function for dynamically activating a policy as the policy of the management of a network. Therefore, an operator is released from the execution of setting.

A third aspect of the invention is characterized in that the name of a design server for route computing to determine a possible path in a network according to an order of a customer is stored in the corresponding server storage part according to the first aspect of the invention as a server in charge of operation for network design. Work for inputting information for selecting a route by an operator can be omitted by using the design server.

A fourth aspect of the invention is characterized in that the name of a customer care server is stored in the corresponding server storage part according to the first aspect of the invention as a server in charge of operation for order processing for processing an order of a customer. Hereby, a load of an operator is reduced.

A fifth aspect of the invention is characterized in that route data/policy data storage part that stores plural sets of route data prepared to select a route suitable for a customer and policy data used to determine a policy of the management of a network is provided to a system wherein a policy server executes setting and the policy server performs network design according to the contents of an order of a customer as operation before setting. That is, even a smaller-scale network can provide communication service in which a load of an operator is reduced by providing the role of a design server to the policy server.

A sixth aspect of the invention is characterized in that in the communication service provision system according to the fifth aspect of the invention, the policy server selects a communication device composing a route in network design. That is, the policy server selects a communication device composing a route on which service requested by a customer can be realized.

A seventh aspect of the invention is characterized in that in the communication service provision system according to the fifth aspect of the invention, the policy server selects a communication device composing a route in network design and generates configuration data set to the communication device.

An eighth aspect of the invention is characterized in that in the communication service provision system according to the second aspect of the invention, the policy server checks whether communication devices can be operated or not before setting configuration data to these communication devices. As a fault caused in a communication device existing on a route after a network is organized prevents the management of the network, it is checked beforehand whether a communication device is active or not.

A ninth aspect of the invention is characterized in that in the communication service provision system according to the first aspect of the invention, data which can be shared by respective servers stored in corresponding server storage part is stored in storage part which the servers can access. Even when a server in charge is replaced by switching operations, the utilization of data is facilitated by sharing data.

A tenth aspect of the invention is characterized in that operation definition part that defines respective operations stored in operational flow storage part according to time series and operation registration part that registers operations defined by the operation definition part in flow according to time series are provided to the communication service provision system according to the first aspect of the invention. Hereby, flexible operational flow can be also registered to a system in which the function of a server is subdivided.

An eleventh aspect of the invention is characterized in that in the communication service provision system according to the first aspect of the invention, operations switching part is provided with scheduling part that sets time when operation to be executed next is executed. Hereby, time when each operation is executed can be regulated and realistic correspondence can be acquired.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF PREFERRED EMBODIMENTS

Embodiments of the invention will be described in detail below.

First Embodiment

Figure 1:
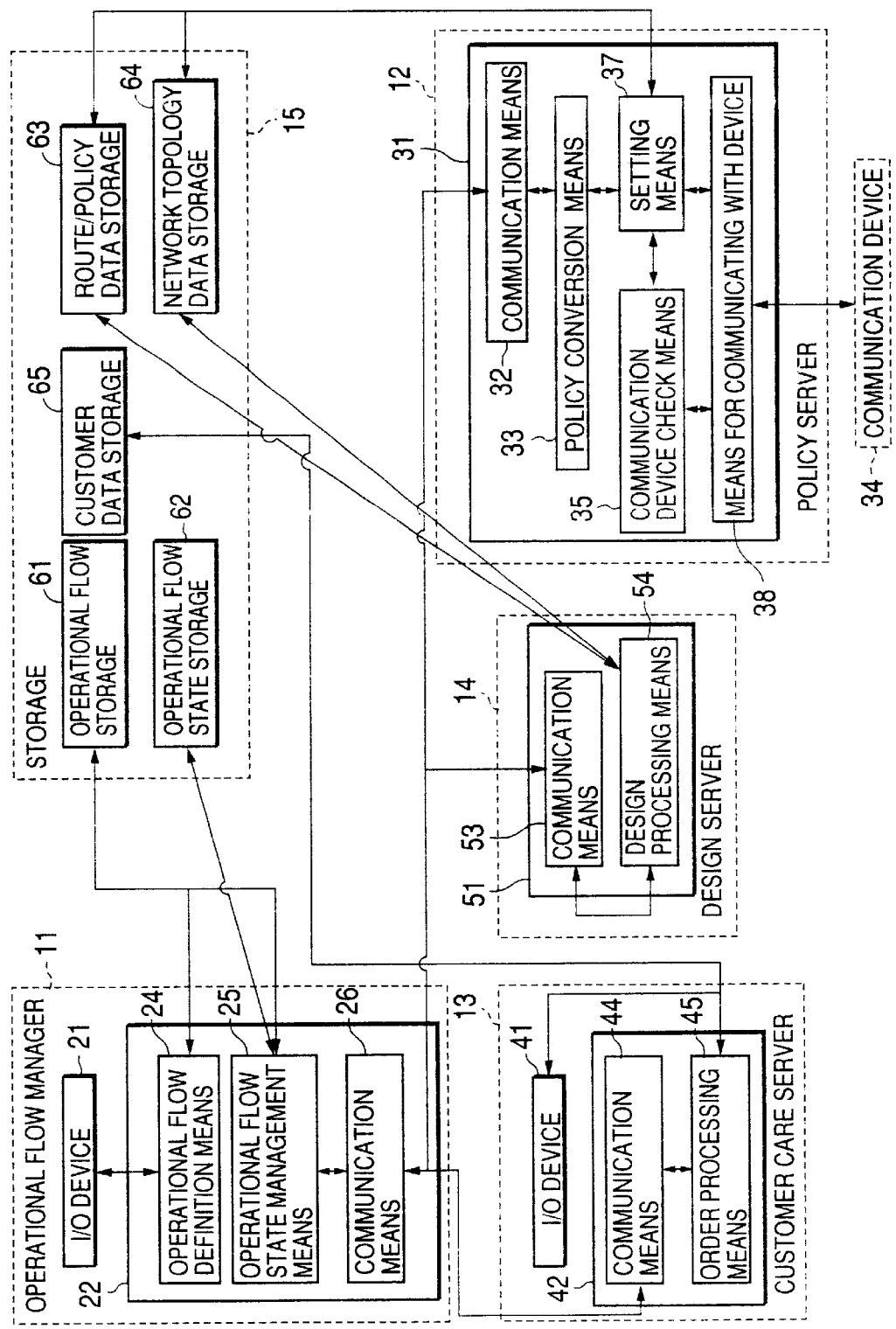
FIG. 1 is a block diagram showing the configuration of a communication service provision system equivalent to a first embodiment of the invention.

FIG. 1 shows the configuration of a communication service provision system equivalent to a first embodiment of the invention. This system is composed of an operational flow manager 11 that manages operational flow, a policy server 12 that manages a network, a customer care server 13 that accepts an order of a customer, a design server 14 that mainly computes to determine a possible path in a network and a storage 15 that stores data required by these units.

Operation in the above description part a processing procedure executed by a network provider to provide communication service to a customer, that is, an end user. For example, a procedure of normal operation is composed of (1) the provision of service, (2) monitoring service and a network and (3) accounting.

The operational flow manager 11 in this embodiment composes a stand-alone one computer system and is provided with an I/O device 21 such as a keyboard and a display for inputting/outputting data and a data processor 22 that executes control action according to a program stored on a storage medium not shown. The data processor 22 is provided with operational flow definition part 24, operational flow state management part 25 and communication part 26 for communicating with each unit.

The policy server 12 is also a stand-alone one server and is provided with a data processor 31 controlled by a program stored on the storage medium not shown. Policy in the above description part the policy of the management of a network. For example, according to a policy, the priority of the utilization of a network is determined based upon the type of an application program and the post of a user, accessible servers are limited and it is the policy server that executes them.

The data processor 31 in the policy server 12 is provided with communication part 32 as an interface for communication, policy conversion part 33 connected with the communication part 32, communication device check part 35 for checking a communication device 34 scheduled to be set using configuration data converted by the policy conversion part 33, setting part 37 for setting and part 38 for communicating with the communication device 34. The part 38 for communicating with the communication device 34 is connected to various communication devices 34 scheduled to be set in addition to being connected with the communication device check part 35 and the setting part 37 respectively in the data processor 31.

The customer care server 13 is also similarly a stand-alone server. The customer care server 13 is provided with an I/O device 41 for inputting/outputting data from/to a customer and a data processor 42 controlled by a program stored on the storage medium not shown. The I/O device 41 part a device for inputting or outputting data such as a keyboard and a display respectively not shown. The data processor 42 is provided with communication part 44 for communicating with each unit and order processing part 45 for processing an order of a customer.

The design server 14 is similarly a stand-along server and is provided with a data processor 51 controlled by a program stored on the storage medium not shown. The design server 14 calculates for a communication route for meeting quality required by a customer for example. Therefore, the data processor 51 in the design server 14 is provided with communication part 53 and design processing part 54 for designing according to an order of a customer.

The storage 15 is composed of the storage medium for storing large quantity of data. The storage medium in the storage 15 is provided with an operational flow storage 61 respectively connected with the operational flow definition part 24 and the operational flow state management part 25 respectively in the operational flow manager 11, an operational flow state storage 62 connected to the operational flow state management part 25, a route/policy data storage 63 connected to the design processing part 54 in the design server 14, a network topology data storage 64 and a customer data storage 65 connected to the order processing part 45 in the customer care server 13.

The I/O device 21 in the operational flow manager 11 is used when an operator enters data in the storage 15. The contents of entry by an operator include the acceptance of service, the design of a network and the definition of operational flow for setting. Operational flow stored in the storage 15 is read for editing and reference and is output from the I/O device 21.

The route/policy data storage 63 stores route data and policy data. Route data part data prepared to adopt a suitable route (path) for a customer and policy data part data used for determining a policy as the management of a network. These route data and policy data are input to the route/policy data storage 63 beforehand by an operator of the policy server 12 or the design server 14. Hereby, in setting, an operator of the policy server 12 is not required to enter configuration data from the I/O device 21 manually. When the policy server 12 reads route data and policy data from the route/policy data storage 63 according to a trigger from the operational flow manager 11 and executes setting, setting without the help of an operator is executed. Setting part setting a communication device. A communication device becomes a state in which it can provide communication service by setting.

The design server 14 manages network topology data stored in the network topology data storage 64, resources which each link has of a network and used resources. Therefore, even in the case of an order from a new customer, a route that meets the quality of required service can be determined. Suppose that the resources of a certain link are a frequency band of 1 Mbps and a frequency band of 600 kbps of it is used. When a new customer requires a frequency band of 128 kbps, the link can accommodate the traffic of the customer.

The operational flow definition part 24 stores operational flow input from the I/O device 21 in the storage 15 and reads operational flow specified via the I/O device 21 from the storage 15. The operational flow state management part 25 generates data for state management referring to operational flow data stored in the operational flow storage 61 in the storage 15 every time the acceptance of service for the provision of communication service to a customer is finished. The data for state management is required for managing the transition of a state such as the start time and the termination time of components of flow. The communication part 26 connected with the operational flow state management part 25 provides an interface when the operational flow manager 11 communicates with the policy server 12, the customer care server 13 and the design server 14.

The policy server 12 is provided with a key function in the communication service provision system in this embodiment. The communication part 32 in the policy server 12 provides an interface for communication between the policy server and the operational flow manager 11.

The policy conversion part 33 in the policy server 12 is part for converting route data and policy data to configuration data for setting to an individual communication device 34 composing a route.

The communication device check part 35 checks whether the communication device 34 is in a state which the communication device can be set by the policy server 12 or not. Concretely, the communication device check part checks whether the communication device 34 is active and connection is established between the communication device and the policy server 12 or not.

The setting part 37 connected to the communication device check part 35 reads configuration data for the communication device scheduled to be set from the route/policy data storage 63 in the storage 15. The communication device is set by downloading the configuration data to the communication device 34. The part 38 for communicating with the communication device provides an interface for communicating with the communication device 34 scheduled to be set.

Next, the customer care server 13 will be described. The I/O device 41 in the customer care server 13 is provided with a function as an input device and a function as an output device. The function as an input device part a function for an operator to accept a service order from a customer using input part such as a keyboard and to enter the type of service ordered by the customer, required service quality, the device data of a communication device provided to the customer and service data such as the quality of service. Customer data such as the name and the phone number of the customer can be also input using the input part.

The function of the I/O device 41 as an output device part a function of displaying contents of accepted service on a device such as a display for verification. The communication part 44 in the customer care server 13 provides an interface with the operational flow manager 11. The order processing part 45 stores customer data input via an operator in the customer data storage 65 in the storage 15 and reads customer data stored in the customer data storage if necessary. The order processing part 45 sends a message that order processing is finished to the operational flow manager 11 using the communication part 44 after service data is stored in the customer data storage 65.

Next, the design server 14 will be described. The communication part 53 in the design server 14 provides an interface for communicating with the operational flow manager 11. The design processing part 54 reads network topology data from the network topology data storage 64 in the storage 15 and reads customer data from the customer data storage 65. The design meeting service quality required by a customer for efficiently managing a network of a network is performed. Route/Policy data as a result of design are stored in the route/policy data storage 63 in the storage 15.

The operational flow storage 61 in the storage 15 stores operational flow defined by an operator of the operational flow manager 11. In this embodiment, operational flow is composed of the acceptance of service, network design and setting. The operational flow state storage 62 stores data for managing the progress of processing after the acceptance of service and the situation of processing is provided to a customer as service.

The route/policy data storage 63 stores route/policy data. Route/Policy data include the type of service and service quality provided to a customer, the device data of a communication device provided to the customer, route information between communication devices to provide communication service meeting quality required by the customer and network management policy information showing a policy of network management.

The network topology data storage 64 stores the identifier of a communication device 34 in a network and connection relationship between communication devices 34. The customer data storage 65 stores customer data such as the name and the phone number of a customer.

Figure 2:
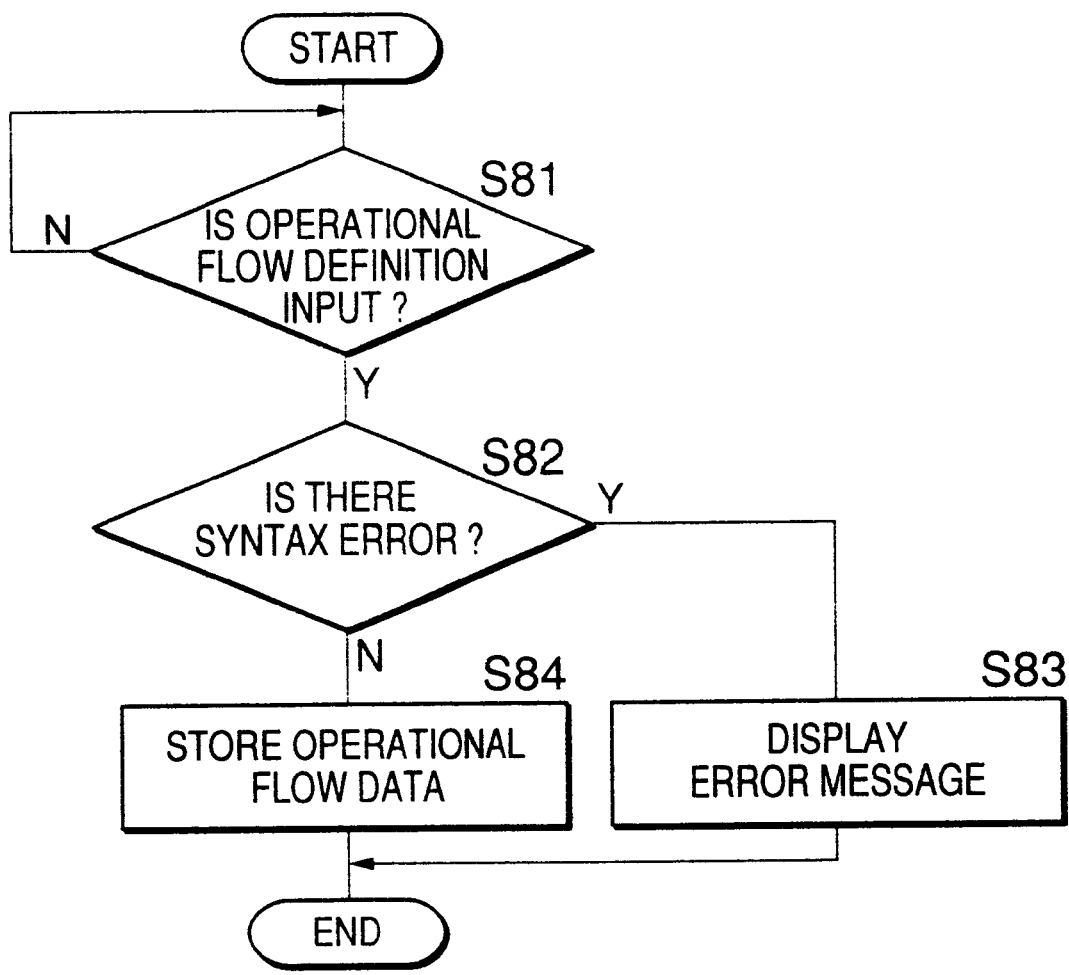
FIG. 2 is a flowchart showing the outline of processing operation on the side of an operational flow manager when operational flow data is input in the first embodiment.

FIG. 2 shows the outline of processing operation on the side of the operational flow manager when operational flow data is input in the communication service provision system configured as described above. The operational flow manager 11 is a unit for managing operational flow and monitors whether operational flow data is input or not (a step S81). In case an operator enters operational flow data (Y), the operational flow manager checks the data structure and checks whether the syntax includes an error or not (a step S82).

Figure 3:
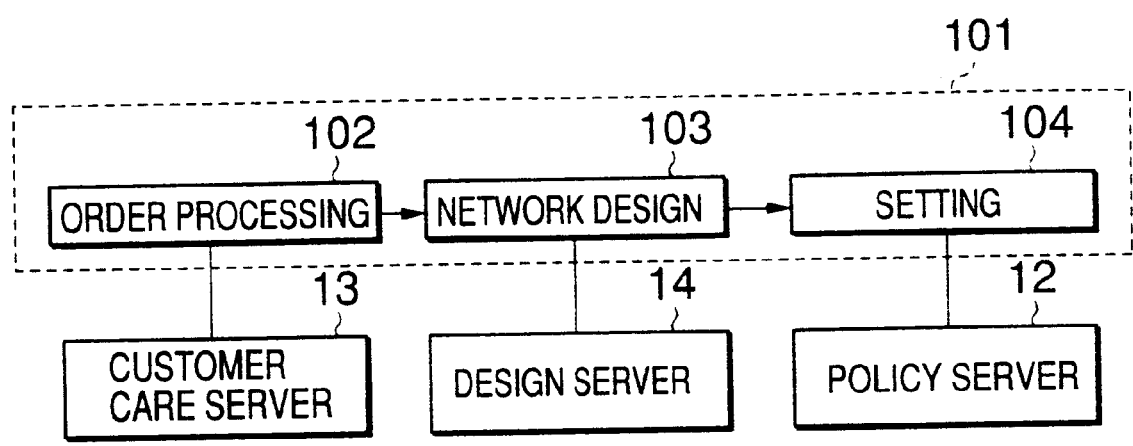
FIG. 3 is an explanatory drawing showing the data structure of operational flow data used in the first embodiment.

FIG. 3 shows the data structure of operational flow data used in this embodiment. Operational flow data 101 is composed of operations composing flow, the order and the name of a server that executes operation. In this embodiment, operation is executed in the order of order processing 102, network design 103 and setting 104 as described above. It is the customer care server 13 that executes order processing 102. It is the design server 14 that executes network design 103. It is the policy server 12 that executes setting 104.

For syntax check processing in the step S82, syntax check data used in defining operation is stored in the operational flow storage 61 in the storage 15. The operational flow definition part 24 reads syntax check data from the operational flow storage 61 and checks the validity of operational flow data input in the step S81. Suppose that setting is located before order processing in input operational flow data though setting 104 is located after order processing 102 in data structure shown in FIG. 3. In this case, it is judged that the syntax includes an error (Y in the step S82). In this case, the error is displayed (a step S83). For example, processing such as displaying the location of an error on a display composing the I/O device 21 is equivalent to it.

In the meantime, in case it is judged that operational flow data is valid (N in the step S82), the operational flow definition part 24 stores the operational flow data in the operational flow storage 61 in the storage 15 (a step S84) and terminates the processing.

Figure 4:
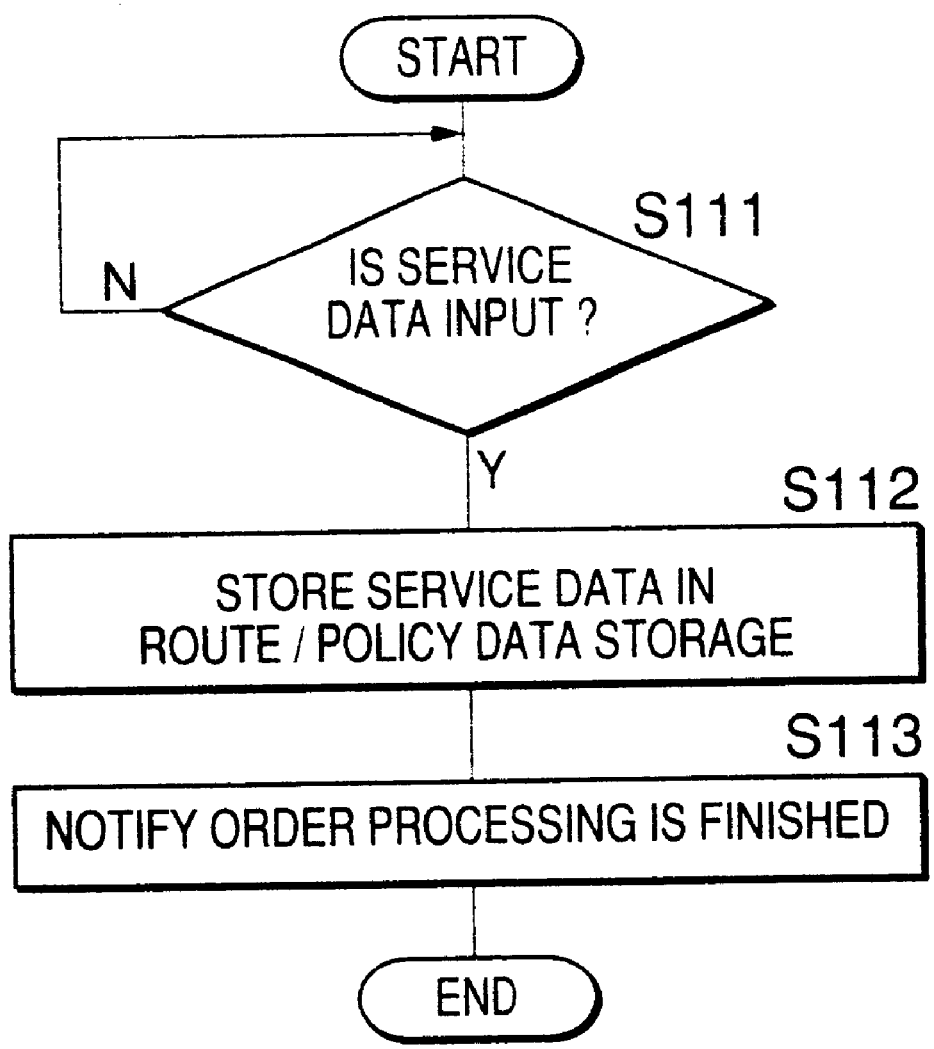
FIG. 4 is a flowchart showing the outline of processing operation on the side of a customer care server in the first embodiment.

FIG. 4 shows the outline of processing operation on the side of the customer care server. When a customer orders communication service, an operator of the customer care server 13 shown in FIG. 1 reads customer data such as the name and the phone number of the customer from the customer data storage 65 via the I/O device 41 and enters service data. Service data includes the type of service ordered by a customer, required service quality, the device data of a communication device 34 provided to the customer and network characteristic information ordered by the customer.

For network characteristic information ordered by a customer, characteristic information that a packet transmitted between a subnetwork 10.24.94. * * * and a subnetwork 10.24.95. * * * is preceded and characteristic information that a packet having an address of 10.24.95.80 and to be sent to a specific host is preceded between eight thirty and three o'clock in the afternoon on the 25th of each month can be given as examples. The latter example shows a case that a characteristic that a packet is processed in advance in case the settling day of each month is the 25th day and the server address of an accounting system is 10.24.95.80 is given to a network.

When service data is input as described above (Y in a step S111), the order processing part 45 stores the service data in the route/policy data storage 63 in the storage 15 (a step S112).

Figure 5:
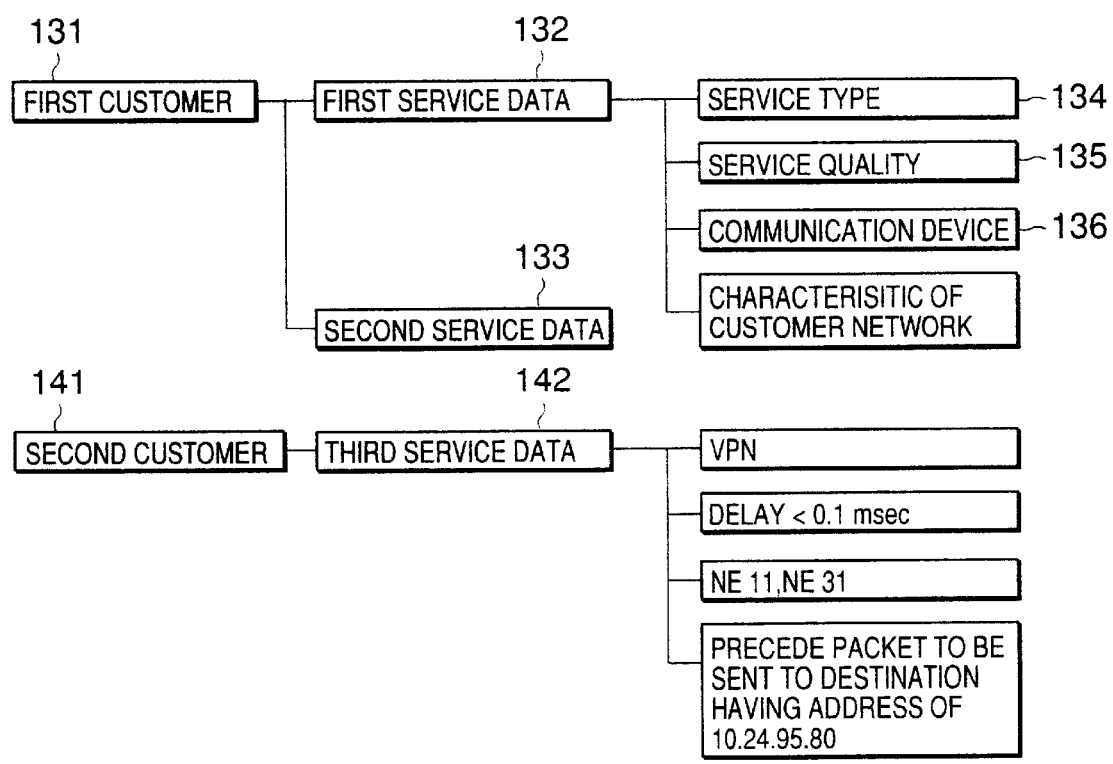
FIG. 5 is an explanatory drawing showing an example of the structure of route/policy data in the first embodiment.

FIG. 5 shows an example of the structure of route/policy data. For a first customer 131, two types of service data of first service data 132 and second service data 133 exist for relationship between the first customer and a network ordered by the first customer. For the first service data 132 of these, a service type 134, service quality 135, a communication device 136 and a customer network characteristic are defined. Though the details of the second service data 133 are not shown, they are defined as the first service data 132.

For a second customer 141, third service data 142 is defined in the case of this example. In the example shown in FIG. 5, virtual private network (VPN) service is provided with quality that delay is 0.1 millisecond or less. Also, it is defined that a communication device 34 provided to the second customer is an eleventh communication device and a thirty-first communication device respectively not shown and a packet to be sent to a destination having an address of 10.24.95.80 is preceded.

When service data is normally stored in the route/policy data storage 63, the order processing part 45 sends a message that the order processing is finished to the operational flow manager 11 via the communication part 44 (a step S113).

Figure 6:
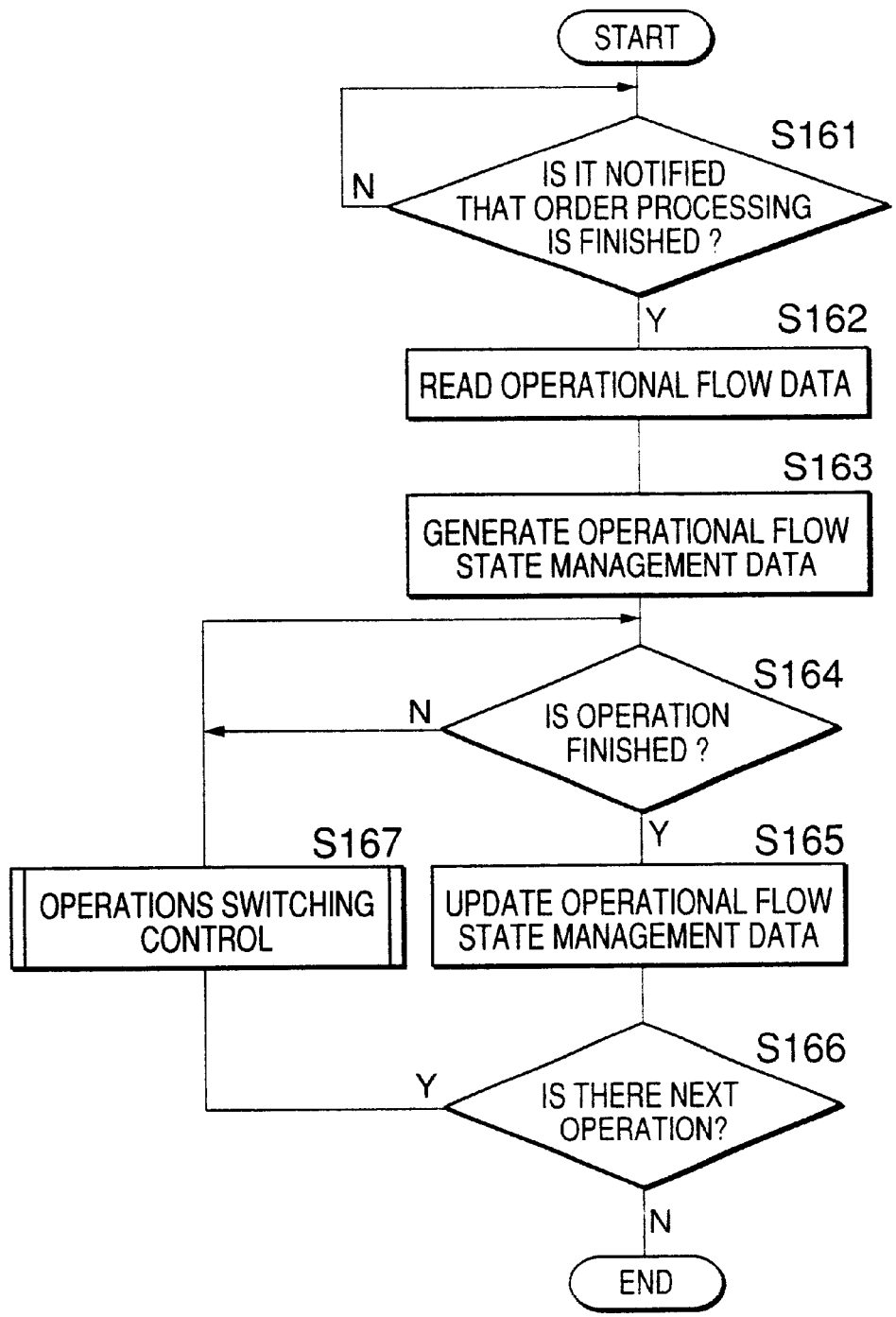
FIG. 6 is a flowchart showing the flow of the processing of operational flow state management data by the operational flow manager in the first embodiment.

FIG. 6 shows the flow of the processing of operational flow state management data by the operational flow manager. The communication part 26 in the operational flow manager 11 waits for a message that order processing is finished to be sent (a step S161). When a message that order processing is finished is sent from the order processing part 45 via the communication part 44 (Y in the step S113 shown in FIG. 5), operational flow data is read from the operational flow storage 61 in the storage 15 (a step S162) and operational flow state management data is generated (a step S163).

Figure 7:
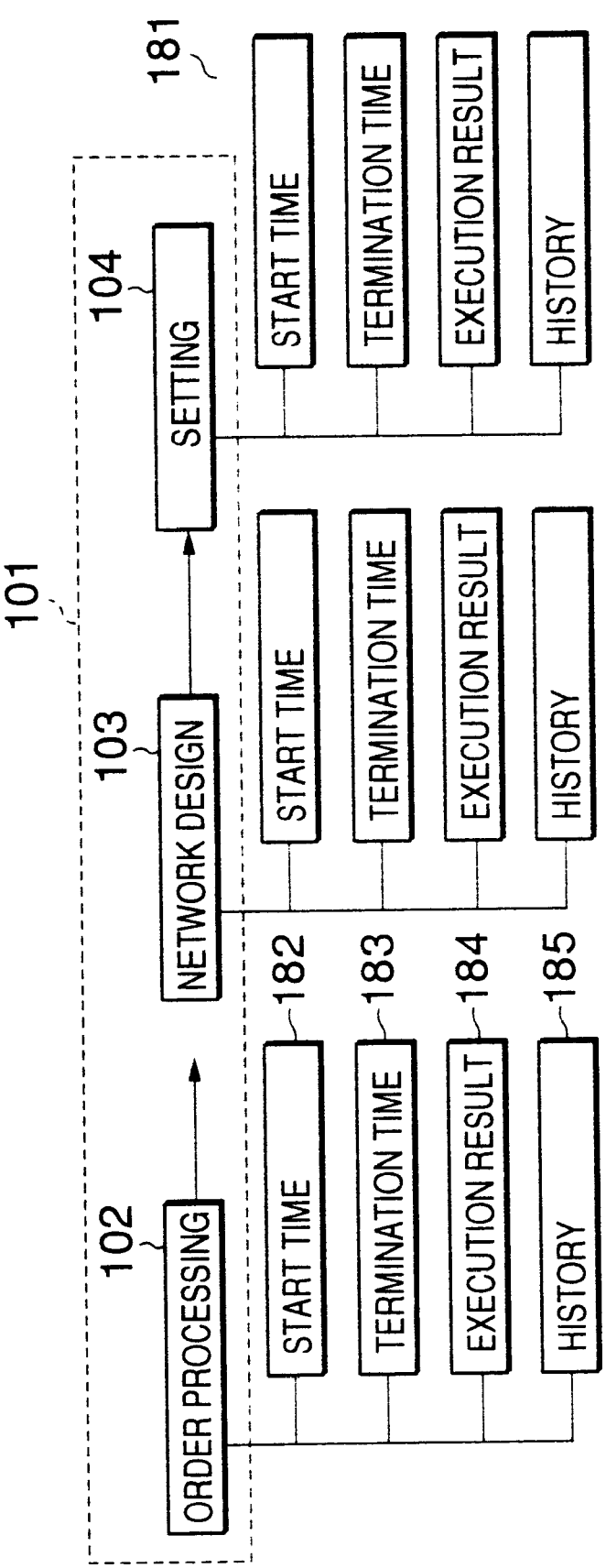
FIG. 7 is an explanatory drawing showing the structure of operational flow state management data in the first embodiment.

FIG. 7 shows the structure of operational flow state management data. Operational flow state management data 181 includes the start time 182, the termination time 183, the result of the execution 184 and the history 185 of each operation of the order processing 102, the network design 103 and the setting 104 of operational flow data 101 shown in FIG. 3. The degree of the progress of the execution of processing in operational flow can be discriminated by managing the start time 182, the termination time 183 and others of each operation as operational flow state management data 181 as described above.

The description will be continued referring to FIG. 6 again. When operational flow state management data is generated in the step S163, the termination of first operation is awaited (a step S164) and at the time of the termination, operational flow state management data is updated (a step S165) In case the next operation exists (Y in a step S166), operations are switched to execute new operation (a step S167). Processing is returned to the step S164 again, the termination of the operation is awaited and operational flow state management data is updated (the step S165). Though in the step S167, operational flow state management data is also updated, this will be described in FIG. 8.

As shown in FIG. 7, operational flow state management data 181 has data structure in which each operation of the order processing 102, the network design 103 and the setting 104 is shown according to time series. Therefore, in case the operational flow state storage 62 is accessed when one operation is finished, the name of operation to be executed next can be acquired. The name of a server used next can be acquired based upon this.

Figure 8:
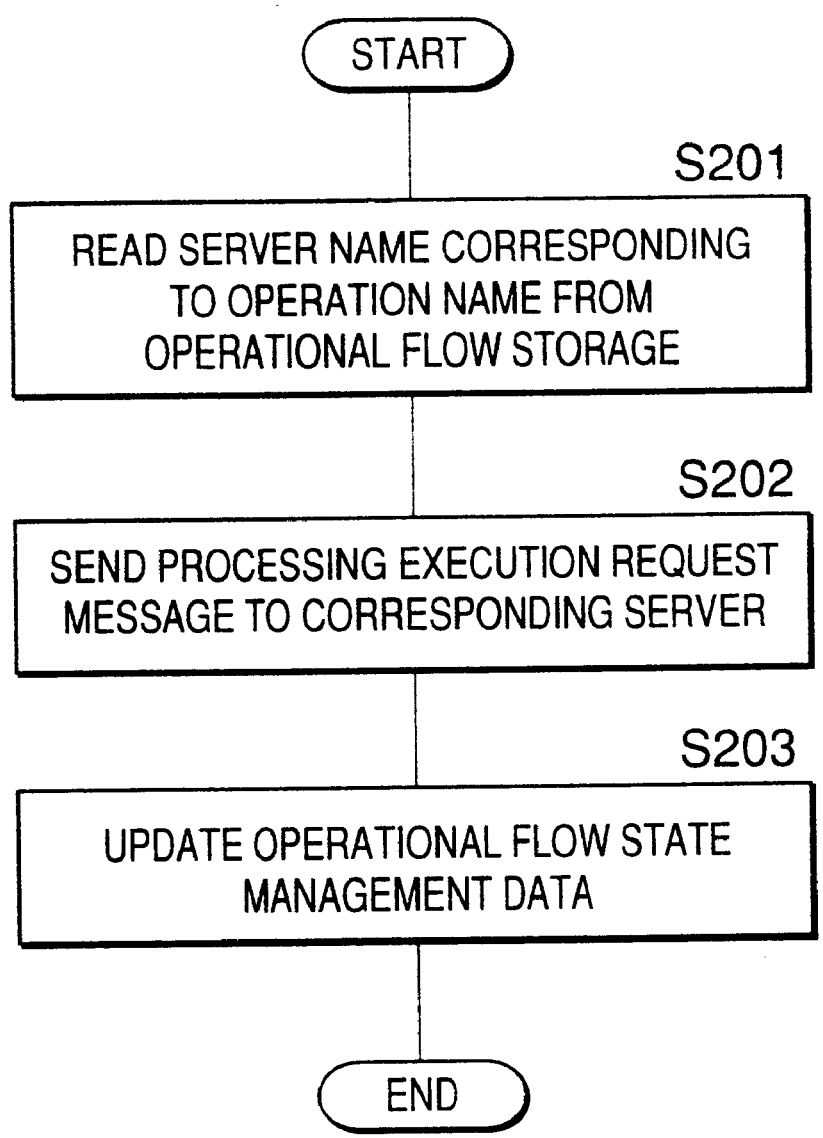
FIG. 8 is a flowchart showing a state of operations switching control based upon operational flow state management data in the first embodiment.

FIG. 8 shows a state of operations switching control based upon operational flow state management data and shows a case that the step S167 is further embodied. That is, in case it proves based upon data stored in the operational flow state storage 62 in the step S166 shown in FIG. 6 that the next operation exists, the operational flow manager 11 reads the name of a server corresponding to the name of operation to be executed next from the operational flow state storage 62 (a step S201) A message requiring the execution of processing is sent to the server (a step S202). Hereby, processing by the server is started. At this time, start time 182 shown in FIG. 7 in operational flow state management data is updated.

Figure 9:
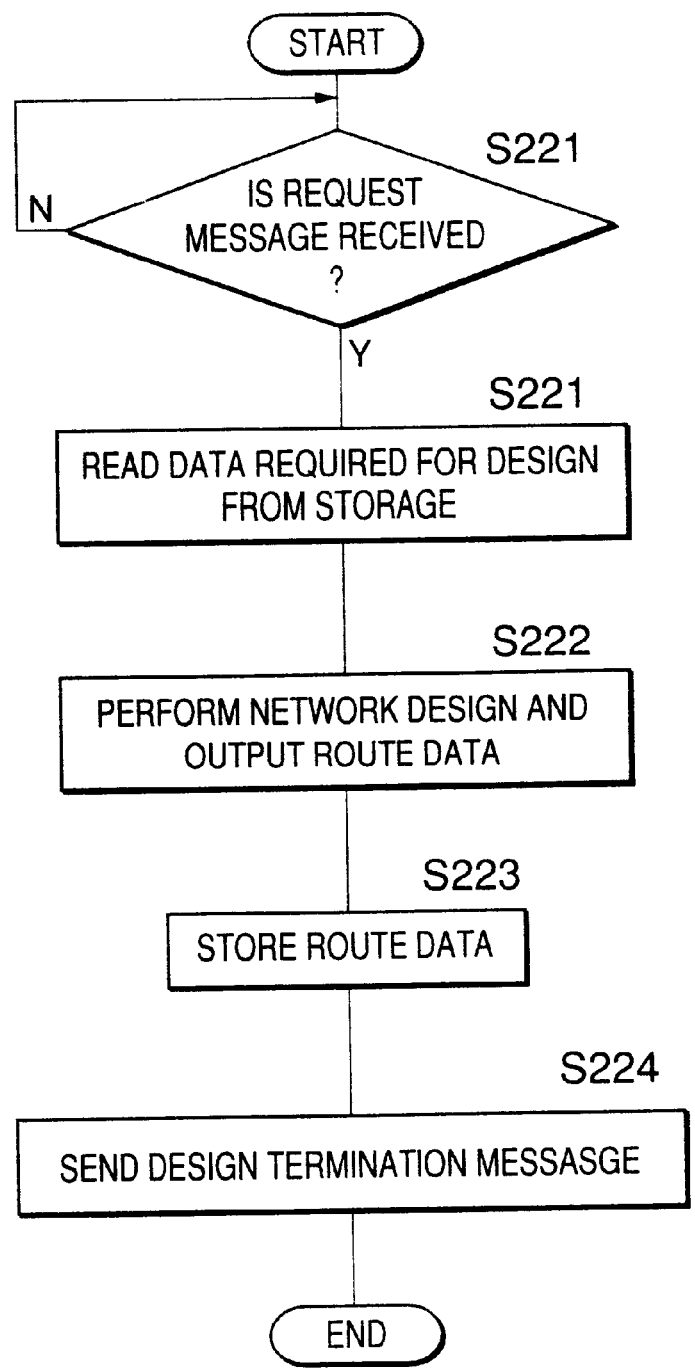
FIG. 9 is a flowchart showing the flow of processing by a design server in the first embodiment.

FIG. 9 shows the flow of processing in case a server to be used next is the design server. The design server 14 waits for a message requesting the execution of processing to be sent from the operational flow manager 11 in the step S202 shown in FIG. 8 (a step S221). When the communication part 53 receives the message (Y), the design processing part 54 reads the corresponding communication device 34 provided to a customer from the customer data storage 65 in the storage 15 and also reads network topology data from the network topology data storage 64 (a step S222). The design processing part 54 executes network design using these data. The design processing part outputs route data for providing desired communication service to the customer (a step S223).

Route data part data including path information for the transfer via plural communication devices 34 of a packet provided to a customer, the communication quality of the route demanded by the customer and the characteristic information of a customer network. A route designed by the design server 14 is provided with network resources that meet communication demanded by a customer. Such route data acquired by processing by the design processing part 54 is stored in the route/policy data storage 63 (a step S224).

When the storage of the route data is finished, the design server 14 sends a design termination message showing that design is finished to the operational flow manager 11 via the communication part 53 (a step S225). The operational flow manager 11 detects that operation in the design server 14 is finished hereby (Y in the step S164 shown in FIG. 6). The operational flow state management part 25 reads operational flow state management data from the operational flow storage 61 and updates it (the step S165). In this example, the termination time, the result and the history of network design are recorded.

When the operation by the design server 14 is finished as described above, the operational flow state management part 25 reads the name of operation to be executed next. In the case of this example, setting is performed. The operational flow state management part 25 reads operational flow data from the operational flow storage 61 and acquires the name of a server to perform setting (the step S201 shown in FIG. 8). In this example, the server is the policy server 12. The operational flow state management part 25 sends a message requesting the execution of processing to the policy server 12 via the communication part 26 (the step S202). Operational flow state management data is updated and the start time of setting operation is recorded (the step S203).

Figure 10:
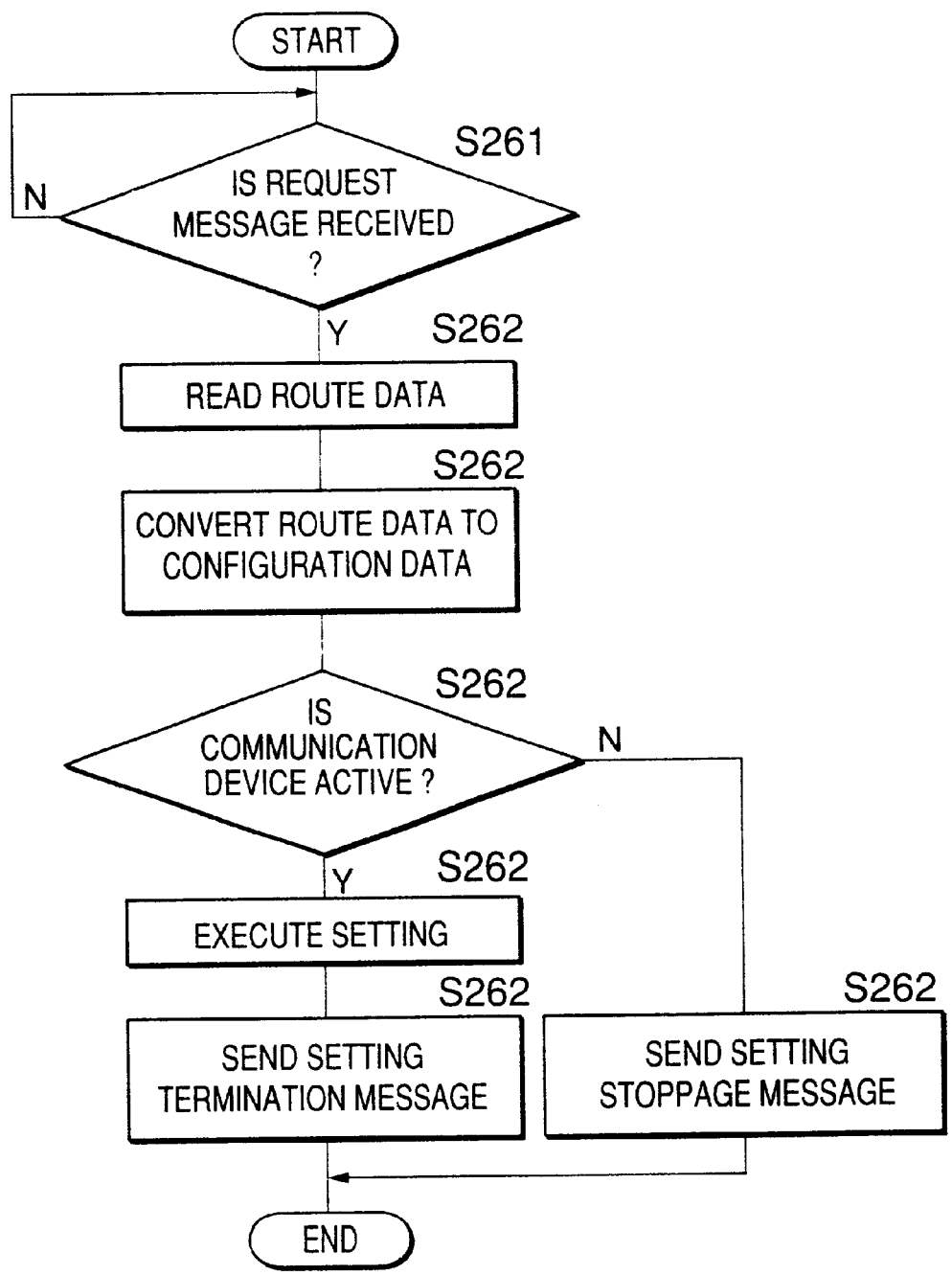
FIG. 10 is a flowchart showing the flow of processing by a policy server in the first embodiment.

FIG. 10 shows the flow of processing by the policy server. The policy server 12 waits for the message requesting the execution of processing to be sent from the operational flow state management part 25 (a step S261). When the communication part 32 receives the request message (Y), the setting part 37 reads route data and a communication device 34 to be set from the route/policy data storage 63 and the network topology data storage 64 (a step S262). The policy conversion part 33 converts the read route data to configuration data for setting to the communication device 34 (a step S263). That is, route data includes a path and communication quality between a customer and the communication device 34 provided to the customer, the characteristic of a customer network and others, and the information is converted to configuration data for setting to an individual communication device 34. Such configuration data includes packet routing, classification into traffic classes, policing, shaping and dropping respectively set to an individual communication device 34 composing a route.

Figure 11:
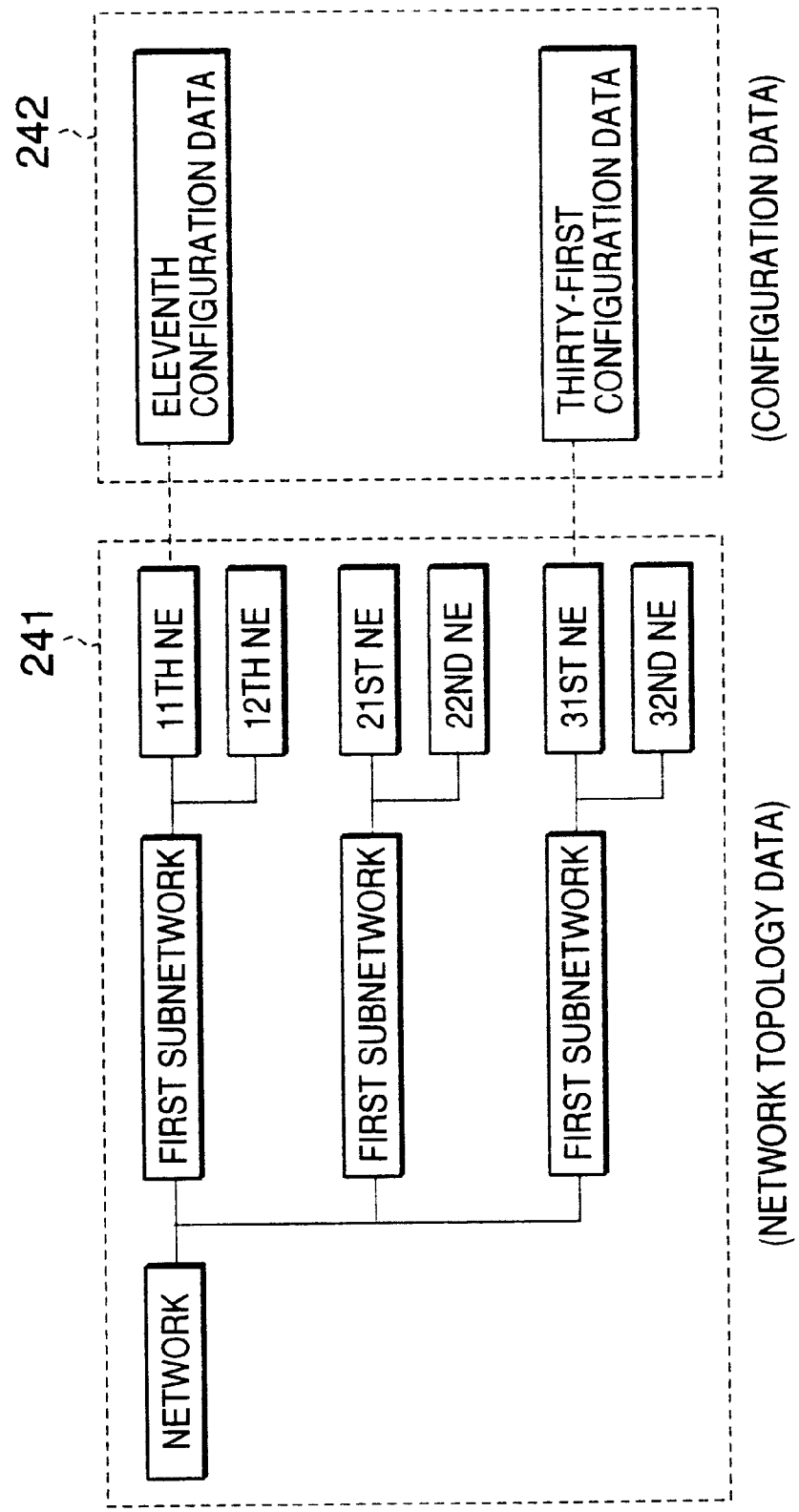
FIG. 11 is an explanatory drawing showing the respective structure of network topology data and configuration data in the first embodiment.

FIG. 11 shows the structure of network topology data and configuration data in this embodiment. Network topology data 241 in this embodiment showing the topology of a network shows that first to third subnetworks are connected to a network. Eleventh and twelfth communication devices (NE) are used for a communication device 34 of the first subnetwork. Twenty-first and twenty-second communication devices are used for a communication device 34 of the second subnetwork, and thirty-first and thirty-second communication devices are similarly used for a communication device 34 of the third subnetwork. Configuration data 242 is set to the respective communication devices 34 composing the networks. For example, in this embodiment, eleventh configuration data is set to the eleventh communication device and thirty-first configuration data is set to the thirty-first communication device.

The description will be continued referring to FIG. 10 again. When route data is converted to configuration data in the step S263, the setting part 37 requests the communication device check part 35 to process and checks whether a communication device 34 scheduled to be set is active or not (a step S264). In case it is diagnosed as a result of the check that the corresponding communication device 34 is not active, the setting part sends a setting stoppage message to the operational flow manager 11 via the communication part 32 (a step S265) and terminates the processing (END).

Figure 12:
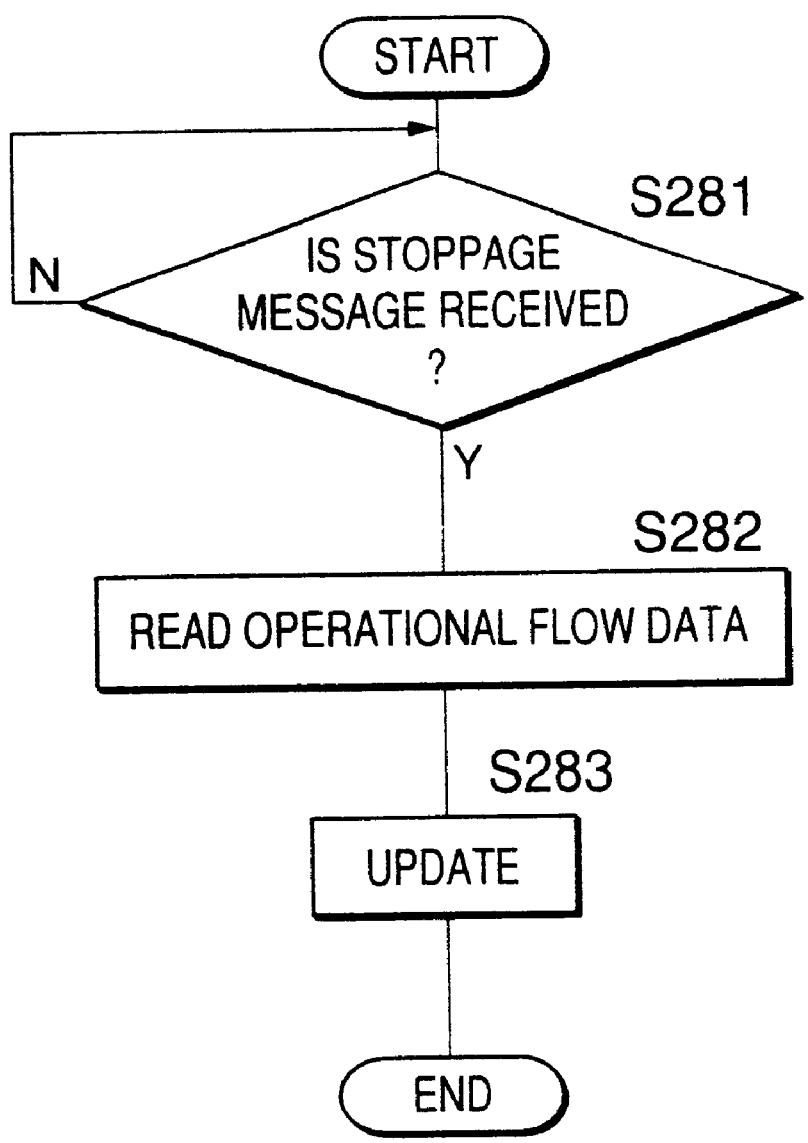
FIG. 12 is a flowchart showing the flow of processing in case the operational flow manager receives a setting stoppage message in the first embodiment.

FIG. 12 shows the flow of processing in case the operational flow manager receives the setting stoppage message. The operational flow manager 11 monitors the incoming of a setting stoppage message (a step S281) When the operational flow manager receives the setting stoppage message via the communication part 26 (Y), the operational flow state management part 25 reads operational flow state management data from the operational flow state storage 62 in the storage 15 (a step S282) and updates data by storing operational flow state management data in the operational flow state storage 62 again (a step S283). In this embodiment, stop time is recorded in the history of setting.

In the meantime, in case a communication device 34 scheduled to be set is active in the processing in the step S264 shown in FIG. 10, the setting part 37 sets configuration data to the communication device 34 via the part 38 for communicating with the communication device (a step S266). In the example shown in FIG. 11, the eleventh configuration data is set to the eleventh communication device and the thirty-first configuration data is set to the thirty-first communication device.

When setting is executed as described above, the setting part 37 sends a setting termination message to the operational flow manager 11 (a step S267).

When the communication part 26 of the operational flow manager 11 receives the setting termination message, the processing after the step S164 shown in FIG. 6 is executed. That is, the operational flow state management part 25 reads operational flow state management data from the operational flow state storage 62 and updates it (the step S165). In this example, the termination time of setting is recorded. The operational flow state management part 25 reads the name of operation to be executed next based upon the operational flow state management data (the steps S167 and S201). However, in this embodiment, as setting is the last operation (N in the step S166), all processing is finished without reading the next operation (END).

In the first embodiment described above, in setting, an operator of the policy server 12 is not required. Therefore, the cost of operation can be reduced and no input error is caused differently from a case that configuration data is manually input as heretofore. In a conventional type communication service provision system, an operator is required to specify an individual device composing a network to provide communication service to a customer. At this time, the operator is required to enter many configuration parameters and is located in environment which is not user-friendly. In the meantime, in the case of the invention, an operator has only to enter quality required by a customer and the characteristic of a customer network or information related to a communication device to be provided to the customer as a policy. The succeeding specification of an individual device scheduled to be set and the succeeding conversion to a configuration parameter are performed by a polygonal server. Therefore, not only communication service can be provided to a customer at a low price because labor costs are reduced but setting can be executed at real time.

The reason why such effect can be acquired is that the policy server 12 reads route data from the storage 15 according to a trigger from the operational flow manager 11, converts it to configuration data and executes setting.

Also, as in the first embodiment, the communication device check part 35 is provided, it can be checked whether respective communication devices 34 are active or not before setting is executed, that is, whether they can be used without an error or not. Therefore, a network for realizing communication service ordered by a customer can be made reliable.

Further, in the first embodiment, data which can be shared by each server is collectively stored and managed in the storage 15. Therefore, a group of servers that execute different types of operations can be collectively managed, not only efficient data management is enabled but electronic data exchange between servers is enabled and the manual reentry of data is not required when the servers utilize data. As the switching of different operations in operational flow is accelerated and no input error is caused, no error of operation caused by an input error is also caused.

Second Embodiment

Figure 13:
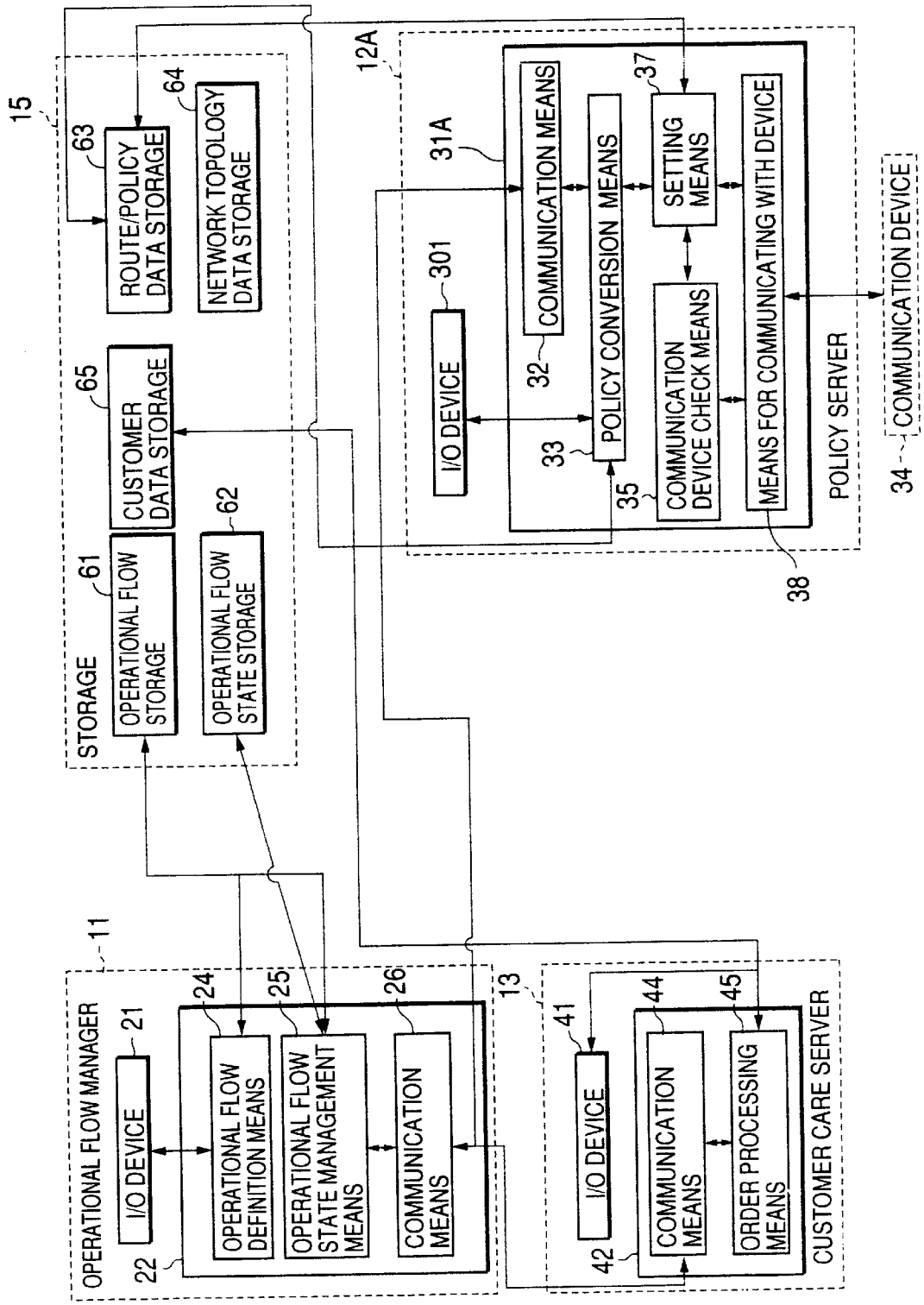
FIG. 13 is a block diagram showing the configuration of a communication service provision system equivalent to a second embodiment of the invention.

FIG. 13 shows the configuration of a communication service provision system equivalent to a second embodiment of the invention. In the second embodiment, the communication service provision system is composed of an operational flow manager 11, a policy server 12A, a customer care server 13 and a storage 15. In the communication service provision system equivalent to the first embodiment, the design server 14 composes a part of the system, however, in the system equivalent to the second embodiment, no design server is required. Also, an I/O device 301 is newly added to the policy server 12A. In FIG. 13, the same reference number is allocated to the same part as the part shown in FIG. 1 and the description is omitted.

The I/O device 301 in the policy server 12A is composed of a device for inputting or outputting data such as a keyboard and a display.

In the first embodiment, the design server 14 designs a network according to an order of a customer and route data as data based for setting to a communication device 34 as a result of the design is stored in the route/policy data storage 63 shown in FIG. 11. In the second embodiment, as no design server 14 exists, the policy server 12A fills the role. An operator of the policy server 12A enters route data and policy data via the I/O device 301 to store them in a route/policy data storage 63 shown in FIG. 13. Policy data part directive data for enabling the policy server 12A to realize contents ordered by a customer.

In such a communication service provision system, the customer care server 13 executes the same processing as the processing in the first embodiment. This is already described in relation to FIG. 4. That is, the entry of service data by an operator and the storage of it in a storage 15A are first executed (steps S111 and S112) and when the processing is finished, the termination of order processing is notified (a step S113).

Processing by the operational flow manager 11 is also similar to that in the first embodiment. That is, when operational flow definition is input as described in relation to FIG. 2 (a step S81), an error in the syntax of the input is checked (a step S82) and in case the input has no error (Y), input operational data is stored in the storage 15 (a step S84) In case the input has an error, error display is performed (a step S83) and the processing is finished (END).

Figure 14:
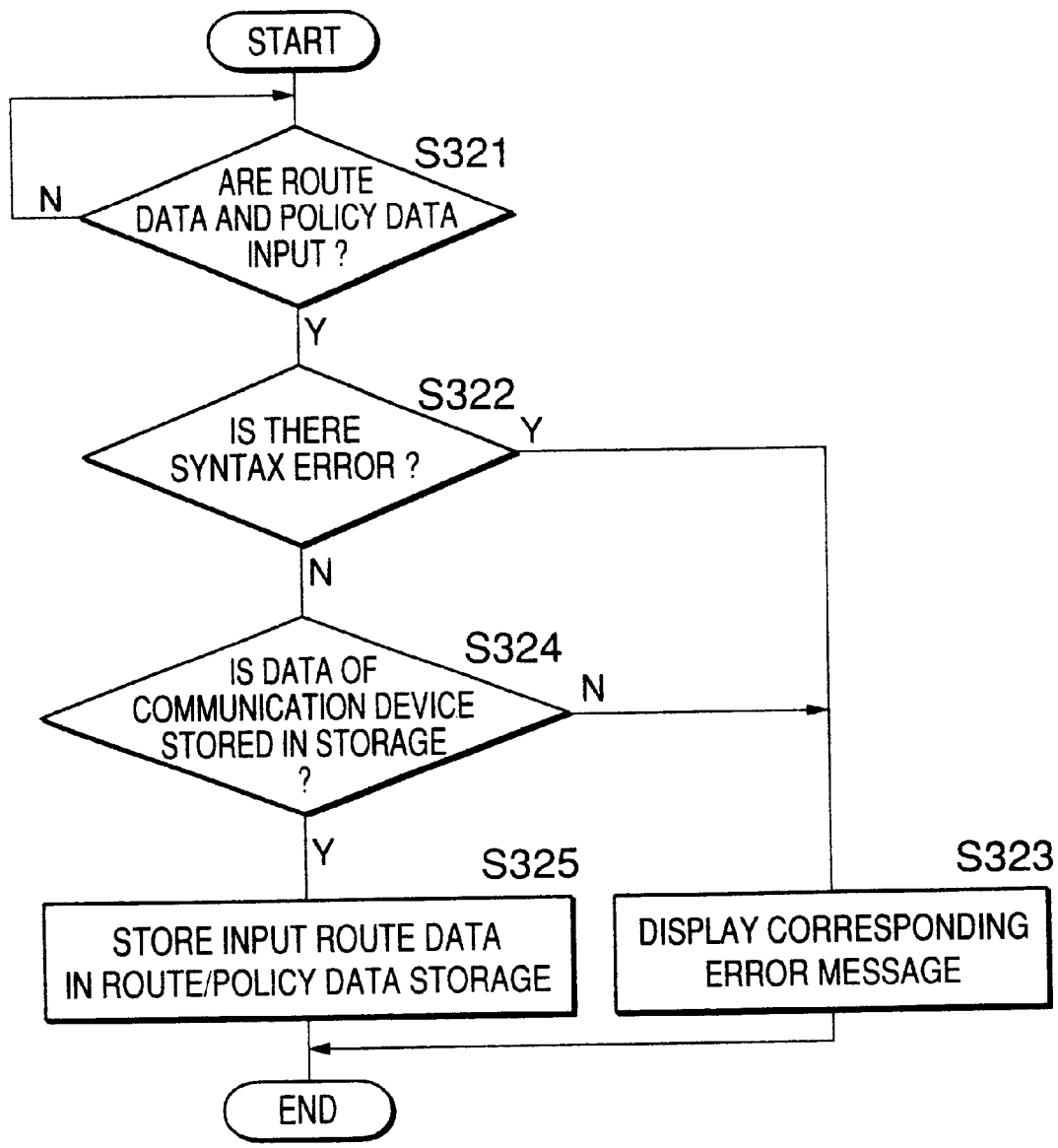
FIG. 14 is a flowchart showing the flow of input processing of a policy server in the second embodiment.

FIG. 14 shows the flow of input processing by the policy server. In the first embodiment, the design server 14 shown in FIG. 1 performs network design for providing communication service to a customer and stores route data acquired as a result in the route/policy data storage 63. In this embodiment, no design server exists. Then, an operator of the policy server 12A enters policy data via the I/O device 301 before setting. Therefore, the central processing unit (CPU) not shown of the policy server 12 monitors input via the I/O device 301 (a step S321) and when policy data is input (Y), policy conversion part 33 checks whether the input has a syntax error or not (a step S322). In case the input has a syntax error, error display showing it is performed (a step S323) and the processing is finished (END).

In the meantime, in case input policy data is correct in syntax, the policy conversion part 33 checks whether the data of a communication device 34 scheduled to be set is stored in a network topology data storage 64 or not (a step S324). In case the data is not stored in the network topology data storage 64, an error showing it is similarly displayed (the step S323) and the processing is finished (END). In case the data of the communication device 34 is stored in the network topology data storage 64 (Yin the step S324), route data entered by an operator is stored in the route/policy data storage 63 (a step S325) and the processing is terminated (END).

In the communication service provision system equivalent to the second embodiment, the processing of operational flow state management data described in the first embodiment is also similarly executed in units of operation. As shown in FIG. 6, every time one operation is finished, operational flow state management data is updated (a step S165) and in case the next operation exists, operations switching control is executed (a step S167). Operations switching control is as shown in FIG. 8. However, in the case of the system equivalent to the second embodiment, as no design server exists differently from the first embodiment, no operations switching control to the design server exists. Also, control in the policy server 12A is also different.

In case the name of a server corresponding to the name of operation to be executed next is read in the step S201 shown in FIG. 8 and the server is the policy server 12A, the operational flow manager 11 sends a message requesting the execution of processing (a setting execution message) to the policy server 12A (the step S202).

Figure 15:
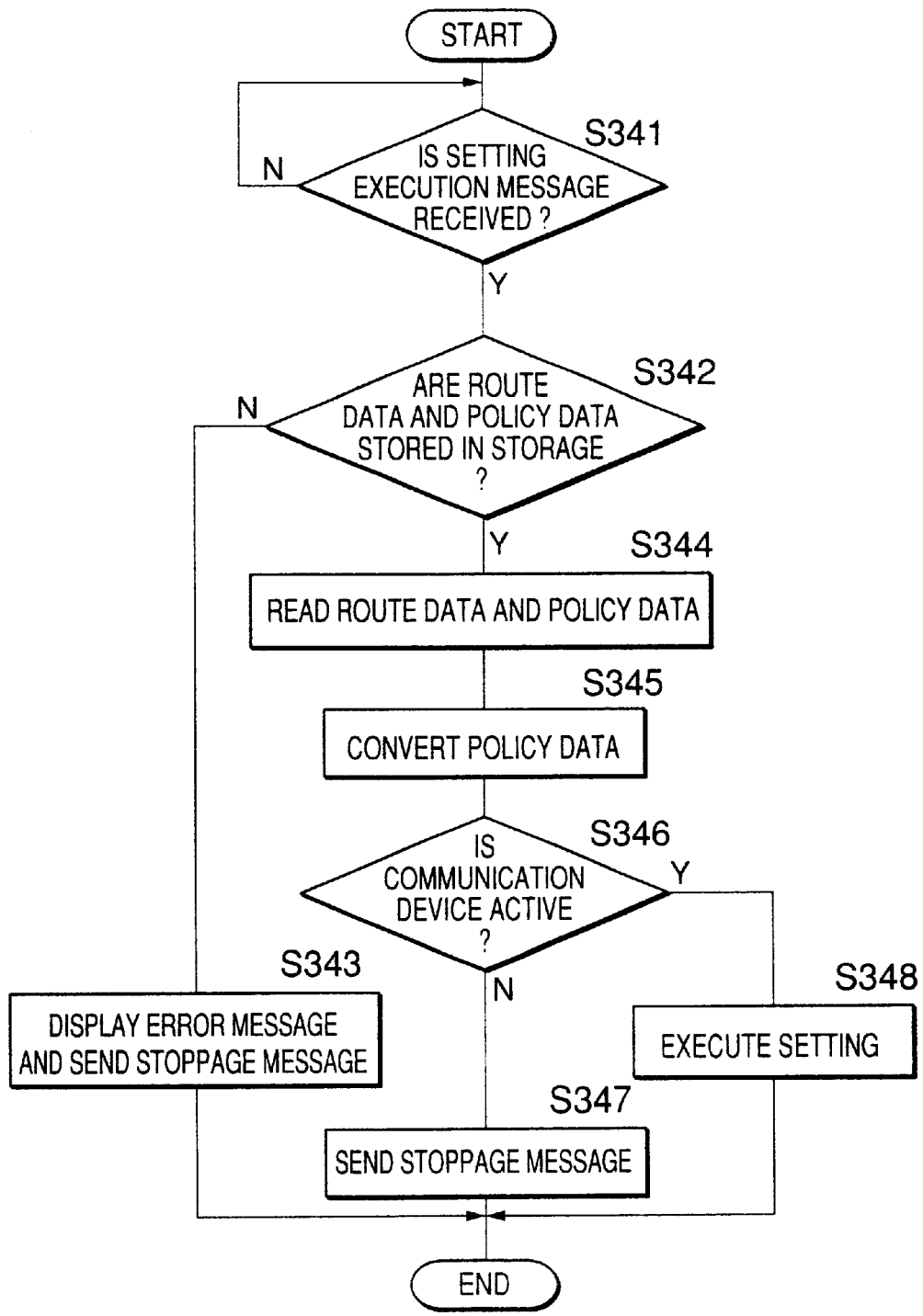
FIG. 15 is a flowchart showing a state of the control of a policy server in case the server receives a setting execution message in the second embodiment.

FIG. 15 shows a state of the control of the policy server in case it receives a setting execution message. When the policy server 12A receives a setting execution message (Y in a step S341), the policy conversion part 33 checks whether the route data and policy data of a communication device 34 scheduled to be set are stored in the route/policy data storage 63 in the storage 15 or not (a step S342).

In case it is discriminated that the corresponding route data and policy data are not stored (N in the step S342), the policy conversion part 33 instructs the I/O device 301 to output an error message and sends a setting stoppage message to the operational flow manager 11 (a step S343).

The operational flow manager 11 executes the processing shown in FIG. 12 in this case in the first embodiment. That is, when the operational flow manager receives a setting stoppage message via the communication part 26 (Y in the step S281), it writes setting stoppage time in the history of operational flow state management data. The operational flow manager stores operational flow state management data in the operational flow state storage 62 (the steps S282 and S283) and the processing is stopped.

In case it is discriminated that the corresponding route data and policy data are stored in the route/policy data storage 63 in the step S342 (Y), the data are read (a step S344). The policy data is converted to configuration data (a step S345) Afterward, the corresponding communication device 34 is checked. That is, setting part 37 in the policy server 12A requests communication device check part 35 to execute the processing and checks whether the communication device 34 scheduled to be set is active or not (a step S346). In case it is diagnosed as a result of the check that the corresponding communication device 34 is not active, the setting part sends a setting stoppage message to the operational flow manager 11 via the communication part 32 and terminates the processing (a step S347). In this case, as the processing is executed by the operational flow manager 11, setting stoppage time is written in the history of operational flow state management data and operational flow state management data is stored in the operational flow state storage 62.

In case a communication device 34 scheduled to be set is active (Y in the step S346), setting is executed (a step S348) That is, the setting part 37 sets configuration data to the corresponding communication device 34 via part 38 for communicating with a communication device. In the example shown in FIG. 11, the eleventh configuration data is set to the eleventh communication device and the thirty-first configuration data is set to the thirty-first communication device.

As described above, in the second embodiment, the management of a communication network is enabled only by slightly changing the policy server 12A without using a design server. Therefore, in a relatively small-scale network the design of which is not required to be supported, the configuration in the second embodiment is effective in that the costs for the management of the network can be reduced by saving a design server.

In the second embodiment, it is already described that a design server is not required because an operator of the policy server 12A enters policy data before setting. This will be further described in detail below. As no design server exists, an operator himself/herself is required to perform the design of a network. Therefore, the operator is required to determine the route between the startpoint node and the endpoint node of the network of a communication device 34. However, most of networks having no design server are small in the scale. Therefore, it is often relatively easy for an operator to determine the route of a network. An operator enters policy data for providing service to a customer.

In this embodiment, as described above, an operator of the policy server 12A enters route data and policy data before setting to store the data in the route/policy data storage 63. The operational flow manager 11 manages the progress of the execution of operation in operational flow defined by the operator based upon operational flow state management data. In setting, the operational flow manager sends an execution request message to the policy server 12A. The policy server 12A reads route data and policy data (a step S344) recognizing the execution request message from the operational flow manager 11 as a trigger (Y in the step S341), converts the route data and policy data to configuration data (a step S345) and executes setting (a step S348). Therefore, in the second embodiment, setting is also executed without requiring the manual operation of an operator.

That is, as an operator does not enter configuration data for setting to an individual communication device 34 but has only to enter policy data, a user-friendly system can be realized. Hereby, the costs of operation can be reduced and operation can be speeded up.

In the first and second embodiments described above, automatic setting by the cooperation of the operational flow manager 1 and the policy server 12 (12A) is described, however, the invention is not limited to this. For example, in the embodiments, immediately after certain operation is finished, the execution of the next operation is requested, however, the operational flow manager 11 is provided with a scheduling function and may also request the execution of the next operation at preset time. For example, in case operations are defined in the order of order processing, network design and setting, the operational flow manager 11 may also send an execution request message to the policy server at the time when setting is to be executed without executing the next operation immediately after network design is finished.

An example that the operational flow manager is provided with a scheduling function as described above will be described below. Suppose that a contract that an order from a customer is accepted on July 28th and network service is to be started on September 1st is made. Suppose that design is completed on July 29th and setting is to be executed on August 31st immediately before September 1st using the scheduling function. The reason why setting is to be executed to various communication devices immediately before the initiation of network service is that communication is enabled before the initiation of service according to the contract. The reason is the same reason as the service of a mobile telephone is enabled on a contracted day for example. The provision of communication service according to an actual contract is enabled by providing a scheduling function as described above.

As described above, according to the first aspect of the invention, as operational flow composed of a series of operations for providing communication service to a customer is stored in the operational flow storage part and the name of a server that executes individual operation is stored in the corresponding server storage part, operation can be executed by a server provided with a dedicated function, operations can be efficiently executed and a problem caused by concentrating processing on one processor can be avoided by distributed processing. As the termination of operation is detected and processing is switched to a server to execute the next operation, processing can be automated.

Also, according to the second aspect of the invention, as the policy server executes setting, an operator is not required to set concrete configuration data and an error caused by an operator can be prevented.

Further, according to the third aspect of the invention, as operation for network design is executed by the design server, the operation of an operator can be similarly reduced and an error caused by an operator can be prevented.

Also, according to the fourth aspect of the invention, as operation for order processing for processing an order of a customer is executed by the customer care server, a load of an operator can be reduced.

Further, according to the fifth to seventh aspects of the invention, even a smaller-scale network can provide communication service in which a load of an operator is reduced by making the policy server fill the role of the design server.

Also, according to the eighth aspect of the invention, as the policy server checks whether a communication device can be operated or not before the policy server sets configuration data to the communication device in the communication service provision system according to the second aspect, the reliability of communication service according to an order of a customer can be enhanced.

Further, according to the ninth aspect of the invention, as data which is stored in the corresponding server storage part and which can be shared by respective servers is stored in the storage part that can be accessed by the servers in the communication service provision system according to the first aspect, the utilization of the data is facilitated even when servers in charge are switched by the switching of operations and as an operator is not required to reenter the data, the reliability of the data is enhanced.

Also, according to the tenth aspect of the invention, as the operation definition part for defining respective operations stored according to time series in the operational flow storage part and the operation registration part for registering the operation defined by the operation definition part according to time series are provided to the communication service provision system according to the first aspect of the invention, the change of operational flow is enabled and even in the system in which the function of the server is further subdivided, flexible operational flow can be registered. Also, in a network in which no design server exists, flexible service such as making the policy server also function as the design server can be provided.

Further, according to the eleventh aspect of the invention, in the communication service provision system according to the first aspect of the invention, as the operations switching part is provided with scheduling part for setting time when operation to be executed next is executed, time when each operation is executed can be regulated and realistic correspondence such as timing setting on a day when communication is started is enabled.

While this invention has been described in connection with certain preferred embodiment, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A communication service provision system, which process operation-flow automatically according to pre-designed policy comprising:

a policy serving unit that manages a network;

a customer care serving unit that accepts an order of a customer;

an operational flow managing unit that manages operation operational flow;

a storage unit that stores data required by these units;

an operational flow storage part that stores operational flow composed of a series of operations for processing an order of a customer;

a corresponding server storage part that stores the name of each server that executes respective operations stored in the operational flow storage part;

an operation termination detecting part for detecting the termination of respective operations stored in said operational flow storage part; and an operations switching part for executing the next operation by reading operation to be executed next stored in said operational flow storage part and activating a server in charge of the operation every time the operation termination detecting part detects the termination of one operation.

2. A communication service provision system, according to claim 1, further comprising a design serving unit to compute to determine a possible path network.

3. A device for communication service provisioning comprising:

an operational flow storage part that stores operational flow composed of a series of operations for processing an order of a customer;

an corresponding server storage part that stores the name of each server that executes respective operations stored in the operational flow storage part;

an operation termination detecting part for detecting the termination of respective operations stored in said operational flow storage part; and an operations switching part for executing the next operation by reading operation to be executed next stored in said operational flow storage part and activating a server in charge of the operation every time the operation termination detecting part detects the termination of one operation.

\* \* \* \* \*